United States Patent
Viswanathan et al.

(10) Patent No.: US 12,026,841 B2
(45) Date of Patent: Jul. 2, 2024

(54) AUGMENTED REALITY PRODUCT DISPLAY

(71) Applicant: Micron Technology, Inc., Boise, ID (US)

(72) Inventors: Radhika Viswanathan, Boise, ID (US); Zahra Hosseinimakarem, Boise, ID (US); Bhumika Chhabra, Boise, ID (US); Carla L. Christensen, Boise, ID (US)

( * ) Notice: Subject to any disclaimer, the term of this patent is extended or adjusted under 35 U.S.C. 154(b) by 0 days.

(21) Appl. No.: 17/848,580

(22) Filed: Jun. 24, 2022

(65) Prior Publication Data

US 2022/0319137 A1    Oct. 6, 2022

Related U.S. Application Data

(63) Continuation of application No. 17/005,150, filed on Aug. 27, 2020, now Pat. No. 11,373,375.

(51) Int. Cl.

| | |
|---|---|
| *G06T 19/00* | (2011.01) |
| *G06F 3/04815* | (2022.01) |
| *G06F 3/04817* | (2022.01) |
| *G06F 3/0482* | (2013.01) |
| *G06F 3/04845* | (2022.01) |
| *G06F 3/0485* | (2022.01) |
| *G06F 16/54* | (2019.01) |
| *G06Q 30/0282* | (2023.01) |
| *G06Q 30/0601* | (2023.01) |
| *G06T 3/40* | (2006.01) |
| *G06T 15/00* | (2011.01) |
| *H04L 9/40* | (2022.01) |

(52) U.S. Cl.
CPC ........ *G06T 19/006* (2013.01); *G06F 3/04815* (2013.01); *G06F 3/04817* (2013.01); *G06F 3/0482* (2013.01); *G06F 3/04845* (2013.01); *G06F 3/0485* (2013.01); *G06F 16/54* (2019.01); *G06Q 30/0282* (2013.01); *G06Q 30/0643* (2013.01); *G06T 3/40* (2013.01); *G06T 15/00* (2013.01); *H04L 63/083* (2013.01)

(58) Field of Classification Search
CPC ..... G06T 19/00; G06F 16/54; G06F 3/04815; G06F 3/04817; G06F 3/0482; G06F 3/04845
USPC ....................................................... 345/419
See application file for complete search history.

(56) References Cited

U.S. PATENT DOCUMENTS

| | | |
|---|---|---|
| 5,805,718 A | 9/1998 | Inoshiri |
| 9,728,011 B2 | 8/2017 | Lam |
| 10,134,196 B2 | 11/2018 | Wu et al. |
| 10,204,452 B2 | 2/2019 | Kim et al. |
| 10,339,597 B1 | 7/2019 | Blossey |

(Continued)

*Primary Examiner* — Javid A Amini
(74) *Attorney, Agent, or Firm* — Brooks, Cameron & Huebsch, PLLC

(57) ABSTRACT

Methods, devices, and systems related to a computing device for capturing and displaying an augmented reality (AR) image are described. An example method can include capturing a first three-dimensional (3D) figure of a user at a mobile device. The method further includes accessing the first 3D figure of a user at the mobile device. The method further includes receiving, at the mobile device, a selection of a product to display on the 3D figure. The method further includes displaying, on the mobile device, the product to display on the first 3D figure as an augmented reality (AR) image.

20 Claims, 3 Drawing Sheets

(56) References Cited

U.S. PATENT DOCUMENTS

| | | |
|---|---|---|
| 10,395,297 B1 | 8/2019 | Ivie |
| 11,004,128 B1 | 5/2021 | Mishra |
| 2008/0255920 A1 | 10/2008 | Vandergriff |
| 2014/0168217 A1 | 6/2014 | Kim |
| 2015/0089607 A1 | 3/2015 | Hubner |
| 2017/0156430 A1* | 6/2017 | Karavaev ............ G06Q 30/0643 |
| 2017/0322513 A1* | 11/2017 | Zapanta .................... G02B 5/32 |
| 2017/0358138 A1* | 12/2017 | Dack ........................ G06F 1/163 |
| 2019/0076293 A1 | 3/2019 | Zakai |
| 2019/0199993 A1* | 6/2019 | Babu J D ............ H04N 13/279 |
| 2019/0266664 A1* | 8/2019 | Beckham ................ G06Q 20/18 |
| 2019/0304406 A1* | 10/2019 | Griswold ................. G06F 3/011 |
| 2020/0005386 A1* | 1/2020 | Blossey ................ G06T 19/006 |
| 2020/0020166 A1* | 1/2020 | Menard ................... G06V 10/82 |
| 2020/0026257 A1* | 1/2020 | Dalal ................ G05B 19/4063 |
| 2020/0302508 A1 | 9/2020 | Hukerikar |
| 2020/0368616 A1* | 11/2020 | Delamont ............ H04N 13/239 |

* cited by examiner

AUGMENTED REALITY PRODUCT DISPLAY

PRIORITY INFORMATION

This application is a Continuation of U.S. application Ser. No. 17/005,150, filed on Aug. 27, 2020, the contents of which are incorporated herein by reference.

TECHNICAL FIELD

The present disclosure relates generally to a computing device, and more particularly, to methods, apparatuses, and systems related to displaying a product on a 3D figure of an augmented reality (AR) image.

BACKGROUND

A computing device can be, for example, a personal laptop computer, a desktop computer, a mobile device (e.g., a smart phone, a tablet, a wrist-worn device, a digital camera, headset, etc.) and/or redundant combinations thereof, among other types of computing devices. In some examples, a computing device can construct an AR image and display the AR image on a user interface and/or perform artificial intelligence (AI) operations.

AR can overlay virtual objects on a real-world (e.g., natural) environment. For example, AR can add a 3D hologram to reality. In some examples, AR can be an interactive experience of a real-world environment where real-world objects are enhanced by computer-generated perceptual information. The AR can mask a portion of the real-world environment and/or add to the real-world environment such that it is perceived as an immersive aspect of the real-world environment. Accordingly, AR can alter a person's perception of a real-world environment. A heads-up display, a headset, a smart glass, smart contacts, a light field display, a laser, and/or several sources of light can be used to create AR.

DETAILED DESCRIPTION

Figure 1:
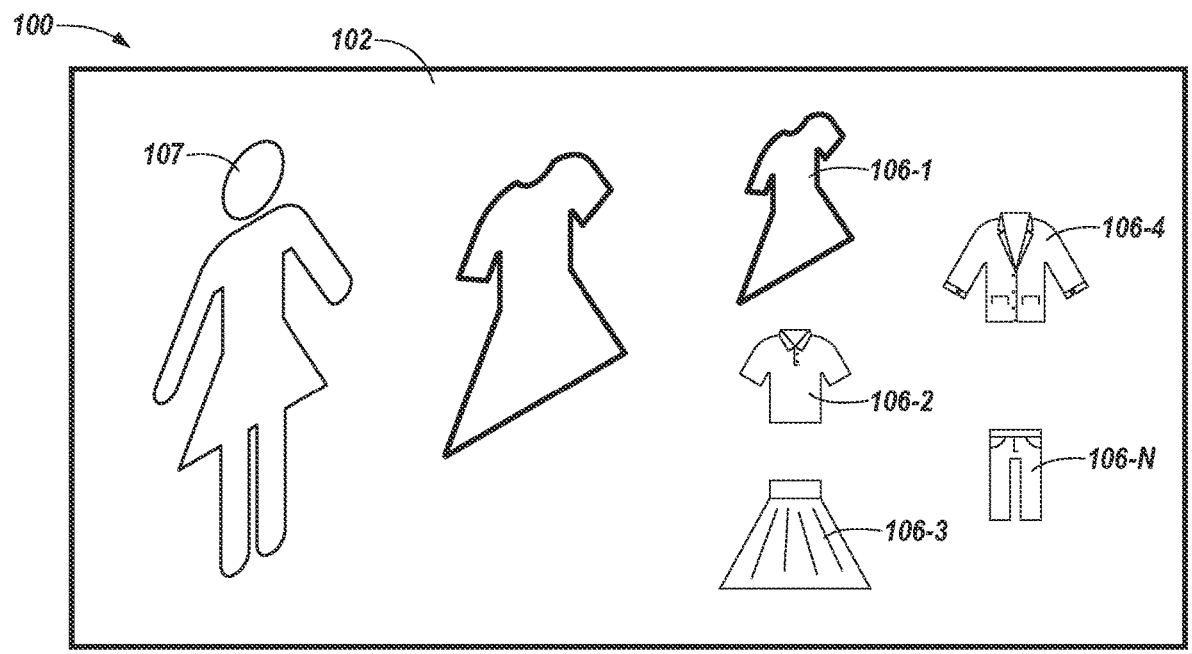
FIG. 1 illustrates an example of a user interface of a computing device for displaying a product on a 3D figure in accordance with a number of embodiments of the present disclosure.

The present disclosure includes methods, apparatuses, and systems related to displaying a product on a three-dimensional (3D) figure. An example method may include capturing a first three-dimensional (3D) figure of a user at a mobile device. The method further includes accessing the first 3D figure of a user at the mobile device. The method further includes receiving, at the mobile device, a selection of a product to display on the 3D figure. The method further includes displaying, on the mobile device, the product to display on the first 3D figure as an augmented reality (AR) image.

A computing device may display a 3D figure of an object that is constructed using microsensors within a camera of the computing device. As used herein, a 3D figure may refer to an image of an object that has height, width, and depth. The 3D figure may be formed with a technique developed to create the illusion of depth in the image. An AR image may be derived from the 3D figure and projected on the user interface or the user. The 3D figure may be of a person, such as a user of the computing device. The AR image may be produced by placing a product such as clothing on the 3D figure. The AR image may be produced by placing clothing (e.g., an image of the clothing) on the 3D figure's head, torso, limbs, feet, or a combination thereof, for example. A user may choose a preferred product, and the preferred product may be displayed on the 3D figure. The AR image may be produced by placing a product on the 3D figure. The AR image may be displayed on the user interface of the computing device. The AR image may also be projected as a hologram onto the user. The AR image may be displayed as a computing device-generated image superimposed on a user's real-world view. In some examples, the AR image may be viewed by projecting a hologram of the product onto the user. The AR image may also be viewed by projecting a hologram of the user's 3D figure wearing the product. The user may be using an AR headset to view the hologram.

The product may be found on an online marketplace. The product may be scaled down to fit the proportions of the 3D figure. The product may be scaled down by the retailer such that the product may fit the user appropriately. The user may choose clothing that appropriately fits the user's measurements based on the measurements acquired by structure arrays of light projected from the computing device's camera using infrared (IR) illumination and visible light. The chosen clothes may be accessible by the computing device. For example, the chosen clothes may be saved in memory on and/or external to the computing device. The saved clothing may be bought by the user or accessed at a later time.

In the following detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, "a number of" something can refer to one or more of such things. For example, a number of computing devices can refer to one or more computing devices. A "plurality" of something intends two or more.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a user interface 102 of a computing device 100 for displaying a product 106-1, 106-2, . . . , 106-n (hereinafter referred to collectively as products 106 or in a generic individual form as a product 106) on a 3D FIG. 107 in accordance with a number of embodiments of the present disclosure. For example, the computing device 100 may be a smart phone or tablet device, among others. The computing device 100 can include a processing resource, a memory coupled to the processing resource, or both, to perform functions associated with displaying a product 106 on the 3D FIG. 107. In a number of embodiments, one or more optical sensors may be used with one or more cameras within the computing device 100 to construct a 3D FIG. 107 associated with an AR image.

The sensors may be used to acquire measurements for the height and weight of the user. That is, the sensors may be used to measure the user's body, gathering the measurements needed for proper fit and function of a product 106 on the user's body. The measurement acquired may also include clothing measurements for the user such as clothing sizes and measurements (e.g., neck size, sleeve length and width, and waist width, among others). Measurements are not limited to the user's body and may also be taken for a user's head or foot, for instance. In some examples, the sensors may be used to measure a width of a user's face, head circumference, neck circumference, arm length, leg length, torso length, waist size, hand size, a width and length of a user's foot, or a combination thereon.

In some examples, the 3D FIG. 107 may be created based on a picture or other image within a memory of the computing device 100. For instance, a photo album located on a smart phone may be accessed and an image chosen to create the 3D figure. The sensors may also be used to obtain the user's measurement based on a scaled measurement of the picture. A 3D FIG. 107 may be formed based on the picture obtained.

An AR image may be derived from the 3D FIG. 107 and displayed on the user interface 102. The AR image may also be projected as a hologram onto the user. The AR image overlays digital information, such as images, onto the 3D FIG. 107. The AR image may be produced by placing a product 106 such as a hat, shirt, or other item of clothing on the 3D FIG. 107. The AR image may be produced by placing clothing on the 3D figure's 107 head, torso, limbs, feet, or a combination thereof, for example. The product 106 may include a dress, as shown, but embodiments of the present disclosure are not limited to this example. The AR image may be displayed as a computing device-generated image superimposed on a user's real-world view. The AR image may be viewed by projecting a hologram of the product 106 onto the user. The AR image may also be viewed by projecting a hologram of the user's 3D figure wearing the product 106. The user may be using an AR headset to view the hologram.

After receiving the 3D FIG. 107, the user may choose to use or discard the received 3D FIG. 107. The computing device 100 may prompt the user to upload another 3D figure or to use a different AR image based on the 3D figure chosen. The user may set a preferred 3D figure. The preferred 3D figure may be accessible by the computing device 100. For example, the preferred 3D figure may be written to memory on and/or external to the computing device 100. The written (e.g., saved) 3D figure may be accessed by using a password. As used herein, the term password refers to a form of security used for user authentication to gain access to a system. For example, it may include, but is not limited to pins numbers, passcodes, passkey, eye scan, or facial recognition etc. A written 3D figure may be accessed at a later time to create an AR image. A user may use or discard a saved 3D figure when accessed.

The user may choose an AR image based on a written 3D figure. The user 107 may also set a preferred AR image. The preferred AR image may be accessible by the computing device 100. For example, the preferred AR image may be written to memory on and/or external to the computing device 100. The written AR image may be accessed by using a password. The preferred AR image may be accessed at a later time. A user may use or discard a saved AR image when accessed.

The AR image may be copied from the user interface 102 onto other mediums such as a website, a document, or an email. In one example, the AR image may be uploaded (e.g., from a photo album of the computing device) directly to a product website. In another example, the user may transfer the AR image from the memory of the computing device 100 onto the product website.

In some examples, products 106 from a retailer may be available on a product website. The retailer may showcase products 106 that have been scaled to fit the 3D FIG. 107. The fit of the product 106 may be substantially similar to a user's in-person trial of the product 106. As used herein, the term "substantially" intends that the characteristic need not be absolute but is close enough so as to achieve the advantages of the characteristic.

The user interface 102 is responsive to receiving a selection by the user. A selection may include a user pressing, tapping, scrolling, and/or clicking on the user interface 102 of the computing device 100. The user interface 102, for instance, may be a touchscreen display. A selection may also be made of the product to be placed on the 3D figure. The selection may be made from a database on a memory of the computing device 100 or other storage (e.g., external storage) of images. The user interface 102 may display products 106 as selected by the user for the AR image.

The computing device 100 may change the product selection on the 3D FIG. 107 responsive to a selection by the user. The product 106 placed on the 3D FIG. 107 may be changed responsive to a scrolling motion by the user. In some examples, the product 106 placed on the 3D figure may be changed responsive to dragging and dropping the products 106. For instance, a user may choose a product 106, and using a digital pen or finger, the user can move the chosen product onto the 3D FIG. 107.

The product 106 may be removed from the 3D FIG. 107 responsive to a user selecting a remove icon. The product 106 may be removed from the 3D figure responsive to the user dragging and dropping the products 106. That is, the user interface 102 may display a second product, such as skirt 106-3, on the 3D FIG. 107 responsive to the user dragging the second product, such as skirt 106-3, designed for the same body part occupied by the first product, for example, pants 106-N.

Figure 2:
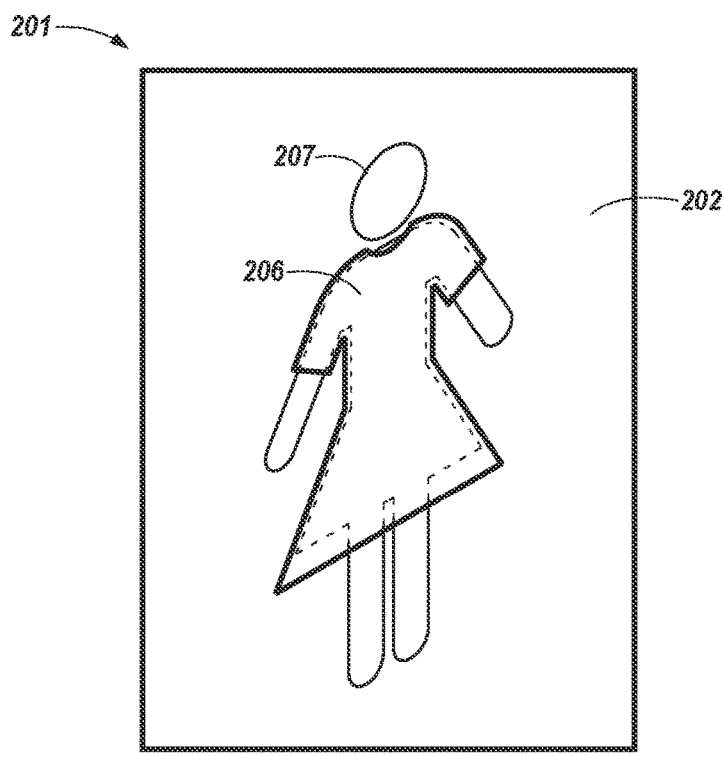
FIG. 2 illustrates another example of a user interface of a computing device for displaying a product on a 3D figure in accordance with a number of embodiments of the present disclosure.

FIG. 2 illustrates an example of a user interface 202 of a computing device for displaying a product 206 on a 3D FIG. 207 in accordance with a number of embodiments of the present disclosure. The cross-sectional view 201 can include the same or similar elements as the example computing device 100 as referenced in FIG. 1. For example, the user interface 202 is analogous or similar to the user interface 102 of FIG. 1. The product 206 is analogous or similar to product 106 of FIG. 1. The 3D FIG. 207 is analogous or similar to 3D FIG. 107 of FIG. 1. The computing device can include a processing resource, a memory coupled to the processing resource, or both, to perform functions associated with displaying a product 206 on the 3D FIG. 207.

When a user selects a product 206 via the user interface (e.g., via a touchscreen), the user interface 202 may display the product 206 on the 3D FIG. 207. The product may be selected by selecting an image of the product from a database of images on a memory of the computing device or other storage (e.g., external storage, cloud storage, etc.). The computing device may automate and/or enhance the AR image to move and/or change on the user interface 202. That is, the computing device may rotate the AR image responsive to the user's command on the computing device. The user may view the fit of the AR image from multiple angles. As such, the user may view the product 206 fit on the 3D FIG. 207 from multiple angles. In some examples, the user interface 202 may display the different angles to view the product 206 on the AR image at once. That is, the user may view the AR image from the front, back, and side on the user interface 202. For instance, a user may view how a shirt fits from different angles.

The product 206 selected is illustrated as a dress in FIG. 2, but examples are not so limited. For instance, the product 206 may be eyewear, a head covering, headgear, shoes, or accessories, among other clothing options. In another example, the user may also layer products 206. That is, a user may choose a first clothing option that may be worn over a second clothing option. The user may view a layered product 206 on the 3D figure as it might fit the user. In one example, a user may choose to layer a jacket on a shirt, currently on the AR image. In a different example, a user may choose to layer two shirts.

In another example, the user may combine products 206. That is, a user may make a first product selection for a first body section and a second product selection for a second body section (e.g., a shirt and pants). As such, the user may view the combination of the first product selection and the second product selection on the user interface 202.

A user may rank products 206 based on preference (e.g., via an application on a mobile device). As used herein, a rank may refer to an orderly arrangement based on a hierarchy to determine relative positions. The user may base the ranking based on products within the database of images based on received user-indicated preferences. That is, the user may rank products within a database of images in the memory of the computing device or other storage based on the user's preference. The user's product ranking may be accessible by the computing device. For example, the user's product ranking may be written to and/or stored in memory on and/or external to the computing device. The user's product ranking may be accessed at a later time. The user's product ranking may be accessed responsive to the computing device receiving a password. The user's product ranking may be edited and reorganized when accessed.

The user may select a preferred product to be saved. For instance, a selection may be made by accessing an application of a mobile device and interacting with a display of the mobile device. The preferred product may be accessible by the computing device. For example, the preferred product may be written to memory on and/or external to the computing device. The written product may be accessed at a later time responsive to the computing device receiving a password. A user may use or discard a saved product when accessed. The user may choose a saved product 206 to be displayed on the 3D FIG. 207. The saved product 206 may be removed from the memory responsive to a user selecting a delete icon.

Figure 3:
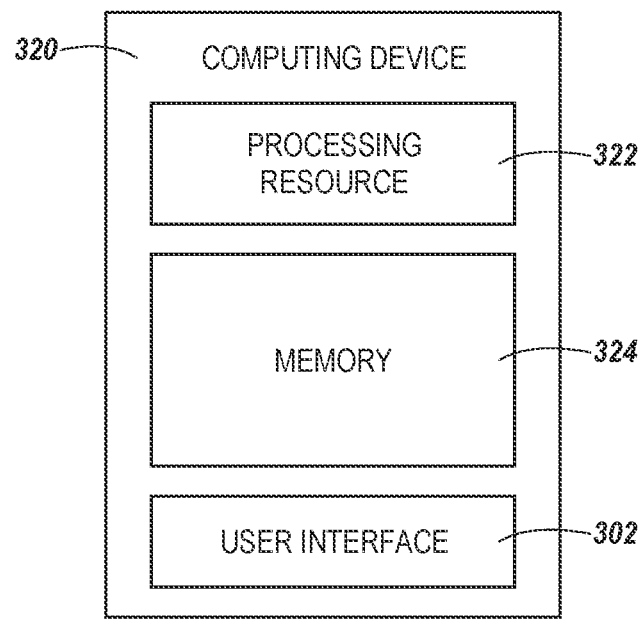
FIG. 3 illustrates an example of a computing device used for displaying a product on a 3D figure in accordance with a number of embodiments of the present disclosure.

FIG. 3 illustrates an example of a computing device 320 used for displaying a product on a 3D figure in accordance with a number of embodiments of the present disclosure. As illustrated in FIG. 3, computing device 320 may include a processing resource (e.g., processor) 322, a memory 324, and a user interface 302.

The memory 324 may be any type of storage medium that can be accessed by the processing resource 322 to perform various examples of the present disclosure. For example, the memory 324 may be a non-transitory computer readable medium having computer readable instructions (e.g., computer program instructions) stored thereon that are executable by the processing resource 322 to receive an input at the computing device 320, capture a 3D figure, and display an AR image on a user interface 302 of the computing device 320 responsive to receiving the input in accordance with the present disclosure.

The memory 324 may be volatile or nonvolatile memory. The memory 324 may also be removable (e.g., portable) memory, or non-removable (e.g., internal) memory. For example, the memory 324 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 324 is illustrated as being located within computing device 320, embodiments of the present disclosure are not so limited. For example, memory 324 may be located on an external computing resource (e.g., enabling computer readable instructions to be downloaded over the Internet or another wired or wireless connection).

Computing device 320 includes a user interface 302. A user (e.g., operator) of computing device 320, may interact with computing device 320 via a user interface 302 shown on a display. For example, the user interface 302 via a display can provide (e.g., display and/or present) information to the user of computing device 320, and/or receive information from (e.g., input/selection by) the user of computing device 3320. For instance, in some embodiments, the user interface 302 may be a GUI that can provide and/or receive information to and/or from the user of computing device 320. The display showing the user interface 302 may be, for instance, a touchscreen (e.g., the GUI can include touchscreen capabilities).

The AR image may be projected on the user interface 302 of the computing device 320. The AR image may be displayed as a computing device-generated image superimposed on a user's real-world view. The AR image may also be projected onto the user as a hologram. The AR image projection may be of the product to be viewed on the user. The AR image projection may be of the user's 3D figure wearing the product. The AR image may be produced by placing a product on the 3D figure.

The computing device 320 may also include an infrared sensor, an eye tracking sensor, a hand tracking sensor, a waveguide, a display, beam-shaping optics, or a combination thereof. The combinations of these technologies within the computing device 320 may assist in defining a user's product preference, suggestions of future products. The technologies within the computing device 320 may assist with detecting a user's movement and location. The technologies within the computing device 320 may also assist with taking measurements for the AR image.

The processing resource 322 may also be configured to execute executable instructions stored in the memory 324 to display eyewear, head coverings, shoes, accessories, a combination thereof, or other clothing options on the 3D figure. The processing resource 322 may also be configured to execute executable instructions stored in the memory 324 to receive a preferred clothing selection by the user and save the preferred clothing selection within the memory 324 of the computing device 320. For instance, the processing resource 322 may receive a selection that was selected by the user via a user interface (e.g., touchscreen display). The user may select a preferred product from a database within memory 324 or other storage of images and products. The preferred product, as selected by the user, may be written the memory 324 of the computing device 320 by the processing resource 322. The preferred product may be accessible by the computing device 320. For example, the preferred product may be written to the memory 324 and/or external to the computing device 320. The written (e.g., saved) product may be accessed at a later time (e.g., via an application of a mobile device) responsive to the computing device 320 receiving a password. A user may use or discard a saved product when accessed.

The processing resource 322 may also be configured to execute executable instructions stored in the memory 324 to display a written clothing selection on the 3D figure. For example, the user may select a preferred product to be written to memory 324. The user may choose a written product to be displayed on the 3D figure. The product may be removed from the memory 324 responsive to a user selecting a delete icon. For example, a user may find a shirt that he or she likes and may display it on the 3D figure. The user may desire to save this image for further consideration. The image may be written to memory 324 or other storage (e.g., cloud photo storage) to be viewed another time and/or later deleted.

The processing resource 322 may also be configured to execute executable instructions stored in the memory 324 to form a 3D figure from photos selected by the user. In some examples, the 3D figure may be created based on a picture or other image written to memory 324 within the computing device 320 and/or on external storage (e.g., cloud storage, external hard drive, etc.). The sensors may also be used to obtain the user's measurement based on a scaled measurement of the picture. A 3D figure may be formed based on the picture obtained.

The processing resource 322 may also be configured to execute executable instructions stored in the memory 324 to receive an additional clothing selection at the mobile device and layer the additional clothing selection on the AR image, wherein an image of the second clothing selection is displayed, via the user interface, on top of the AR image of the clothing selection. For instance, a user may choose to replace shirt A with shirt B to determine which shirt the user prefers. In another example, the user may also layer products. For instance, a user may choose a first clothing option (e.g., a necktie) that may be worn over a second clothing option (e.g., a dress shirt).

The processing resource 322 may also be configured to execute executable instructions stored in the memory 324 to rotate the AR image to display, via the user interface, a multi-sided view of the AR image. When a user selects a product from a database of images, the user interface 302 may display the product on the 3D figure of the user. The computing device 320 may automate and/or enhance the AR image to move and/or change on the user interface 302. That is, the computing device may rotate the AR image responsive to the user's command on the computing device. The user may view the fit of the AR image from multiple angles, and in turn, the product fit on the 3D figure from multiple angles. In some examples, the user interface 302 may display the different angles to view the product on the AR image at once. That is, the user may view the AR image from the front, back, and side on the user interface 302.

The processing resource 322 may also be configured to execute executable instructions stored in the memory 324 to display the clothing selection on a first body section of the 3D figure and an additional clothing selection on a second body section based on received user input. In one example, the user may combine products. That is, a user may choose a first clothing selection for a first body section (e.g., hat) and a second clothing selection for a second body section (e.g., shoes). As such, the user may view the combination of the first clothing selection and the second clothing selection on the user interface 302.

Figure 4:
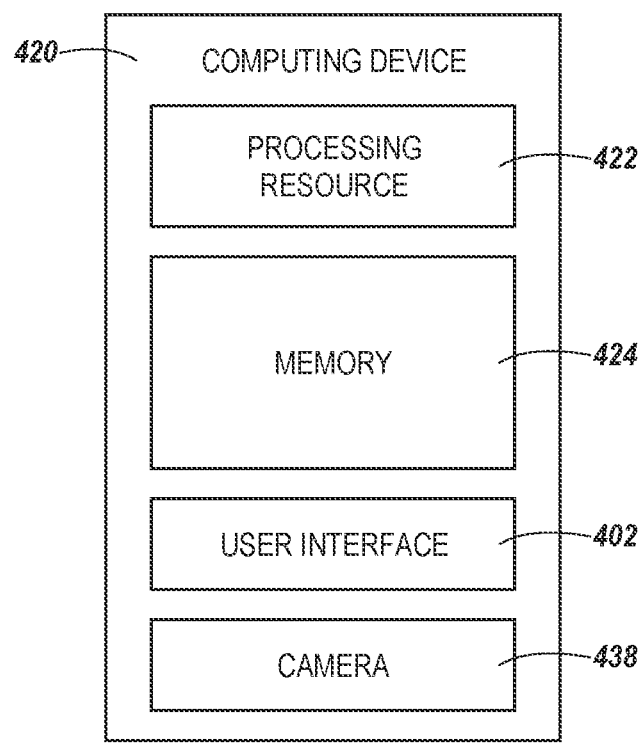
FIG. 4 illustrates another example of a computing device used for displaying a product on a 3D figure in accordance with a number of embodiments of the present disclosure.

FIG. 4 illustrates an example of a computing device 420 used for displaying a product on a 3D figure in accordance with a number of embodiments of the present disclosure. The computing device 420 may be analogous to the computing device 320 illustrated in FIG. 3, in some examples. As illustrated in FIG. 4, computing device 420 may include a processing resource (e.g., processor) 422, a memory 424, a user interface 402, and a camera 438.

The memory 424 may be any type of storage medium that can be accessed by the processing resource 422 to perform various examples of the present disclosure as previously discussed herein with respect to FIG. 3.

The computing device 420 includes a user interface 402. A user (e.g., operator) of computing device 420, may interact with computing device 420 via a user interface 402 shown on a display. For example, the user interface 402 via a display can provide (e.g., display and/or present) information to the user of computing device 420, and/or receive information from (e.g., input/selection by) the user of computing device 420. For instance, in some embodiments, the user interface 402 may be a GUI that can provide and/or receive information to and/or from the user of computing device 420. The display showing the user interface 402 may be, for instance, a touchscreen (e.g., the GUI can include touchscreen capabilities).

The computing device 420 may include one or more cameras 438. The one or more cameras 438 may be used to detect a user and to project microsensors. In some examples, one of the one or more cameras 438 may be used solely for detecting a user. In a number of embodiments, one or more optical sensors, may be used with the one or more cameras or instead of the one or more cameras to detect the user.

The processing resource 422 may also be configured to execute executable instructions stored in the memory 424 to protect written (e.g., saved) selected products by using a password. The user may select a preferred product to be saved, for instance via a touchscreen display of a mobile device. The preferred product may be accessible by the computing device 420. For example, the preferred product may be written to memory on and/or external to the computing device 420.

The processing resource 422 may also be configured to execute executable instructions stored in the memory 424 to receive a ranking of the products within a database of images located within the memory 424 or other storage based on the user's preference, and the user's product ranking may be accessible by the computing device 420. For instance, a user may rank a plurality of shirts he or she would like to view or have previously viewed and/or displayed on the 3D figure.

The processing resource 422 may also be configured to execute executable instructions stored in the memory 424 to write a user's product preference rank to memory 424 or other storage. For example, the user's product ranking may be written to memory 424 and/or storage external to the computing device 420. The user's product ranking may be accessed at a later time (e.g., via an application of a mobile device). The user's product ranking may be accessed responsive to the computing device 420 receiving a password. The user's product ranking may be edited and reorganized when accessed.

Figure 5:
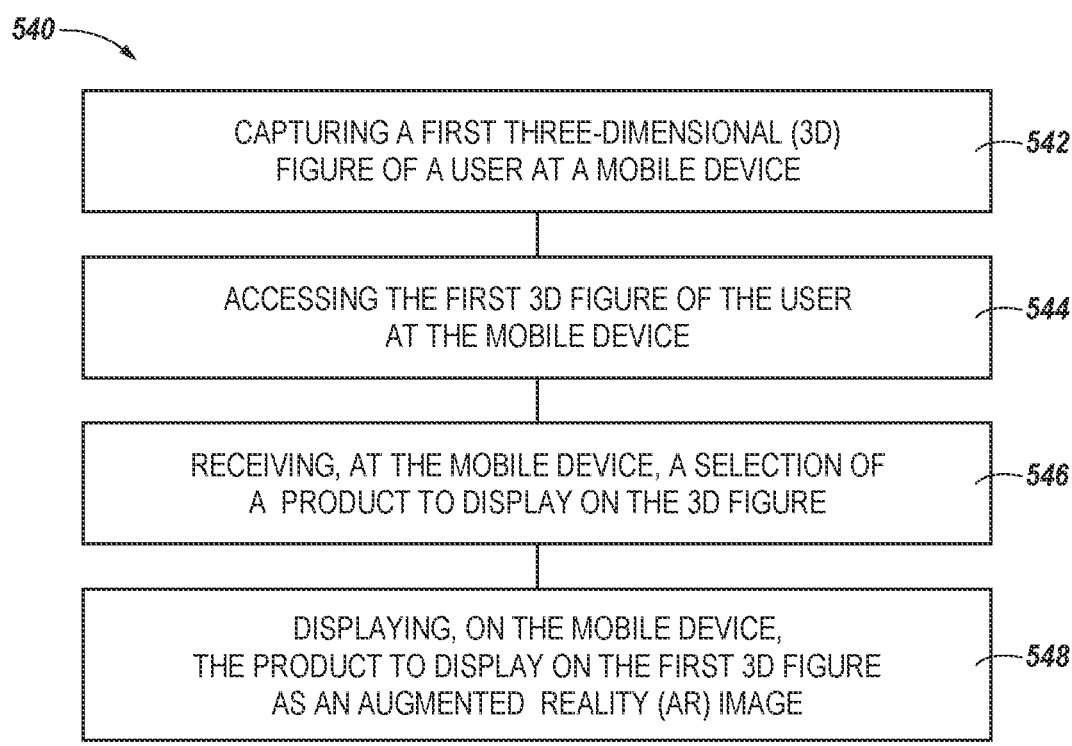
FIG. 5 is a flow diagram of a method for displaying a product on a 3D figure in accordance with a number of embodiments of the present disclosure.

FIG. 5 is a flow diagram of a method 540 for displaying a product on a 3D figure in accordance with a number of embodiments of the present disclosure. The method 540, for instance, can be performed, for example, via a mobile device or other computing device comprising a processor, a memory coupled to the processor, or both, to perform actions associated with displaying a product on a 3D figure. At block 544, the method 540 may include capturing a first three-dimensional (3D) figure of a user at a mobile device. In a number of embodiments, one or more optical sensors may be used with one or more cameras within the mobile device to capture a 3D figure associated with an AR image.

At block 542, the method 540 may include accessing the first 3D figure of the user at the mobile device. The 3D figure may be created based on a picture or other image captured by the cameras of the computing device. The picture may be uploaded to the memory of the computing device or other storage (e.g., cloud computing storage) and accessed to get a first 3D figure of the user. In some examples, the 3D figure may also be created based on a picture within the computing device (e.g., saved in a photo album of a tablet).

A 3D figure may be formed based on the picture obtained. The user may set a preferred 3D figure. The preferred 3D figure may be accessible by the computing device. For example, the preferred 3D figure may be saved in memory on and/or external to the computing device. The saved 3D figure may be accessed by using a password. A saved 3D figure may be accessed at a later time to create an AR image. A user may use or discard a saved 3D figure when accessed.

At block 544, the method 540 may include receiving, at a mobile device, a selection of a product, from a database of images, to display on the 3D figure. The database may be located within a memory of the mobile device or other storage. The memory may be accessible by the processing resource of the mobile device. In some examples, products from a retailer may be available on a product website. The retailer may showcase products that have been scaled to fit the 3D figure. The processing resource of the mobile device may retrieve body proportions of the user saved on a memory of the mobile device, select an image from a database of images of the product to display on the first 3D figure captured by the mobile device and scale the image of the product to the retrieved body proportions of the user. That is, the processing resource of the mobile device may resize the product image selected by the user to fit the user's body proportions as retrieved by the processing resource of the mobile device.

The mobile device (e.g., the processing resource, memory, or both) may also receive body proportions of the user inputted into the mobile device in real time, select an image from a database of images located within the memory of the mobile device or other storage of the product to display on the first 3D figure captured by the mobile device and scale the image of the product to the received body proportions of the user. That is, the processing resource of the mobile device may resize the product image selected by the user to fit the user's body proportions as written by the user on by the computing device.

At block 546, the method 540 may include displaying, on the mobile device (e.g., via a user interface), the product to display on the 3D figure as an AR image. An AR image may be derived from the 3D figure. AR can overlay virtual objects on a real-world environment to mask a portion of the real-world environment and/or add to the real-world environment such that it is perceived as an immersive aspect of the real-world environment.

The AR image may be projected on the user interface of the mobile device. The AR image may be displayed as a computing device-generated image superimposed on a user's real-world view. The AR image may also be projected onto the user as a hologram. The AR image projection may be of the product to be viewed on the user. The AR image projection may be of the user's 3D figure wearing the product. The AR image may be produced by placing a product on the 3D figure. The product may be eyewear, head covering, headgear, shoes, or accessories, among other clothing item options on the 3D figure. The AR image may be produced by placing clothing on the 3D figure's head, torso, limbs, feet, or a combination thereof, for example. The user interface may display products from a database of product images located within the memory or other storage as selected by the user for the AR image. When a user selects a product (e.g., via a touchscreen of the mobile device), the user interface may display the product on the 3D figure of the user. The processing resource of the mobile device may select an image of the product to display from a database of images based at least in part on a dimension of the first 3D figure captured by the mobile device camera. The mobile device may render a second 3D figure using the selected image from the mobile device's memory. The mobile device may then display, via the user interface, the second 3D figure as the AR image by placing the selected clothing product on the second 3D figure.

The computing device may change the product selection to be viewed on the 3D figure responsive to a selection by the user. The product placed on the 3D figure may be changed responsive to a scrolling motion by the user. The product placed on the 3D figure may be changed responsive to dragging and dropping the products. The product may be removed from the 3D figure responsive to a user selecting a remove icon. The product may be removed from the 3D figure responsive to the user dragging and dropping the products. That is, the user interface may display a second product on the 3D figure responsive to the user dragging the second product designed for the same body part occupied by the first product.

In the above detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

It is to be understood that the terminology used herein is for the purpose of describing particular examples only and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically and, unless stated otherwise, can include a wireless connection for access to and/or for movement (transmission) of instructions (e.g., control signals, address signals, etc.) and data, as appropriate to the context.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    capturing, utilizing sensors, first data image for a first three-dimensional (3D) figure of a user at a mobile device,
        wherein the first data image comprises measurements of the user based on a scaled measurement of an image within a memory of the mobile device and obtained by the sensors;
    accessing the first data image for the first 3D figure of the user at the mobile device;
    receiving, at the mobile device, a selection of second data for a product to display on the first 3D figure;
    modifying the second data to scale down the second data for the selection based at least in part on the first data image for the first 3D figure;
    creating an augmented reality (AR) image on a user interface of the mobile device from the modified second data to depict overlaying the product on the first 3D figure;
    projecting the AR image as a holographic representation of the user;
    creating another AR image responsive to receipt of third data for a new product selection at the mobile device to depict overlaying the product with the new product on the first 3D figure; and
    projecting the another AR image as another holographic representation of the user.

2. The method of claim 1, further comprising:
    selecting the second data for an image of the product to display on a first body section;
    selecting a third data for an image of a second product on a second body section; and
    displaying the product and the second product on the AR image simultaneously.

3. The method of claim 2, further comprising creating the AR image using one of a heads-up display, a headset, a smart glass, smart contacts, a light field display, and a laser.

4. The method of claim 2, further comprising copying the modified second data for the AR image onto a website.

5. The method of claim 1, further comprising:
    retrieving body proportions of the user saved on a memory of the mobile device; selecting an image from a database of images of the product to display on the first 3D figure; and
    modifying the second data based at least in part on the retrieved body proportions of the user.

6. The method of claim 1, further comprising capturing the first data image using optical sensors on the mobile device.

7. An apparatus, comprising:
    a user interface of a mobile device;
    a camera of the mobile device;
    a memory of the mobile device; and
    a processing resource configured to execute executable instructions stored in the memory to:
    capture, utilizing sensors first data image for a three-dimensional (3D) figure of a user using the camera of the mobile device,
        wherein the first data image comprises measurements of the user based on a scaled measurement of an image within a memory of the mobile device and obtained by the sensors;
    access the captured first data image for the 3D figure of the user within the memory of the mobile device;
    receive second data for a clothing selection from a database of images at the mobile device to display on the 3D figure;
    modify the second data to scale down the second data based at least in part on the first data image for the 3D figure;
    create an augmented reality (AR) image on the user interface of the mobile device from the modified second data to depict overlaying the clothing selection on the 3D figure;
    project the AR image as a holographic representation of the user;
    create another AR image responsive to receipt of third data for a new clothing selection from a display of the database of images to depict overlaying the clothing selection with the new clothing selection on the 3D figure; and
    projecting the another AR image as another holographic representation of the user.

8. The apparatus of claim 7, wherein the processing resource receives a request for a user-set preferred AR image.

9. The apparatus of claim 7, wherein a plurality of sources of light are used to create the AR image.

10. The apparatus of claim 7, further comprising instructions executable to change the clothing selection on the 3D figure responsive to input received from a digital pen on the user interface.

11. The apparatus of claim 7, further comprising instructions executable to display the AR image from a plurality of angles at once.

12. The apparatus of claim 7, further comprising instructions executable to:
receive third data for the second clothing selection at the mobile device; and
create the another AR image responsive to receipt of the third data, wherein the another AR image comprises the second data for an image of the second clothing selection displayed, via the user interface, on top of the AR image of the clothing selection.

13. The apparatus of claim 7, further comprising instructions executable to:
access a user's clothing measurement from the memory of the mobile device;
create a 3D figure from a user's clothing measurement; and
capture the first data image from the 3D figure.

14. The apparatus of claim 13, further comprising instructions executable to receive fourth data for a new clothing selection to replace the clothing selection on the 3D figure.

15. An apparatus, comprising:
a user interface;
a memory; and
a processing resource configured to execute executable instructions stored in the memory to:
access a picture of a user within a mobile device;
convert, using sensors and based on a scaled measurement of the picture, the picture to first data image comprising measurements of the user for a three-dimensional (3D) figure of the user;
select second data for a product from a database of images within the memory or other storage on the mobile device;
modify the second data to scale down the second data for the selection based at least in part on the first data image for the 3D figure;
create an augmented reality (AR) image on the user interface of the mobile device from the modified second data to depict overlaying product on the 3D figure;
project the AR image as a holographic representation of the user;
create another AR image responsive to receipt of third data for a new product selection using the database of images on the mobile device to depict overlaying the product with the new product on the 3D figure;
project the another AR image as another holographic representation of the user; and
write the selected product to the memory.

16. The apparatus of claim 15, further comprising instructions executable to receive a product selection grouped based on body section within the database of images.

17. The apparatus of claim 16, further comprising instructions executable to save user preferences within the grouped product.

18. The apparatus of claim 15, further comprising the processor in communication with a headset to view the AR image.

19. The apparatus of claim 15, further comprising instructions executable to receive a ranking of the products within the database of images based on received user-indicated preference.

20. The apparatus of claim 19, wherein the database of images is accessed via a website.

* * * * *